United States Patent
Liang et al.

(10) Patent No.: US 11,647,384 B2
(45) Date of Patent: May 9, 2023

(54) COMPUTER PROGRAM, COMPUTER-READABLE STORAGE MEDIUM TRANSMITTING DEVICE, RECEIVING DEVICE AND METHODS PERFORMED THEREIN FOR TRANSFERRING BACKGROUND USER DATA

(71) Applicant: Telefonaktiebolaget LM Ericsson (publ), Stockholm (SE)

(72) Inventors: Hongxin Liang, Upplands Väsby (SE); Gábor Stikkel, Sollentuna (SE); Maxim Teslenko, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 147 days.

(21) Appl. No.: 15/754,792

(22) PCT Filed: Sep. 1, 2015

(86) PCT No.: PCT/SE2015/050917
§ 371 (c)(1),
(2) Date: Feb. 23, 2018

(87) PCT Pub. No.: WO2017/039499
PCT Pub. Date: Mar. 9, 2017

(65) Prior Publication Data
US 2018/0242143 A1     Aug. 23, 2018

(51) Int. Cl.
*H04W 8/24*      (2009.01)
*H04W 4/70*      (2018.01)
(Continued)

(52) U.S. Cl.
CPC ............. *H04W 8/245* (2013.01); *H04L 67/10* (2013.01); *H04L 67/12* (2013.01); *H04L 67/34* (2013.01);
(Continued)

(58) Field of Classification Search
CPC .......... H04L 69/22; H04L 67/12; H04W 4/70
See application file for complete search history.

(56) References Cited

U.S. PATENT DOCUMENTS

2003/0069988 A1   4/2003   Rune et al.
2009/0201930 A1*  8/2009   Appleby ............. H04L 12/1886
                                                    370/392

(Continued)

FOREIGN PATENT DOCUMENTS

GB      2314998 A       1/1998
WO      2010082042 A1   7/2010
WO      WO-2010082042 A1 * 7/2010 ............. H04L 45/54

OTHER PUBLICATIONS

Costa, D. et al., "Effect of Frame Size on Energy Consumption in Wireless Image Sensor Networks", 2012 IEEE International Conference on Imaging Systems and Techniques, Jul. 16-17, 2012, pp. 1-6, Manchester, UK.

(Continued)

*Primary Examiner* — Shukri Taha
(74) *Attorney, Agent, or Firm* — Coats & Bennett, PLLC

(57) ABSTRACT

Embodiments herein relate to a method performed by a transmitting device (12) for transferring background user data to a receiving device (10) in a communication network (1). The transmitting device (12) intercepts a packet, which packet comprises foreground user data in a payload field of the packet. The transmitting device (12) determines that the packet is intended for the receiving device (10). The transmitting device (12) establishes an available amount of data in the payload field of the packet. The transmitting device (Continued)

(12) adds the background user data for the receiving device (10) to the established available amount of data in the payload field. The transmitting device (12) transmits the packet with the foreground user data and the background user data to the receiving device (10).

20 Claims, 8 Drawing Sheets

(51) Int. Cl.
| | | |
|---|---|---|
| *H04W 4/18* | (2009.01) | |
| *H04L 69/22* | (2022.01) | |
| *H04L 67/12* | (2022.01) | |
| *H04L 69/16* | (2022.01) | |
| *H04L 67/10* | (2022.01) | |
| *H04L 67/00* | (2022.01) | |

(52) U.S. Cl.
CPC ............ *H04L 69/16* (2013.01); *H04L 69/161* (2013.01); *H04L 69/22* (2013.01); *H04W 4/185* (2013.01); *H04W 4/70* (2018.02)

(56) References Cited

U.S. PATENT DOCUMENTS

| | | | | |
|---|---|---|---|---|
| 2009/0251616 | A1* | 10/2009 | Seo | H04N 5/4401 348/726 |
| 2010/0238931 | A1* | 9/2010 | Meyer | H04L 69/22 370/392 |
| 2010/0267368 | A1* | 10/2010 | Masputra | H04M 1/72527 455/414.1 |
| 2011/0310898 | A1* | 12/2011 | Alkhatib | H04L 29/12358 370/392 |
| 2012/0320772 | A1* | 12/2012 | Frederiks | H04L 47/10 370/252 |
| 2013/0148547 | A1* | 6/2013 | Page | H04L 67/12 370/255 |
| 2014/0074946 | A1 | 3/2014 | Dirstine et al. | |
| 2014/0226457 | A1* | 8/2014 | Hsueh | H04L 43/50 370/216 |
| 2015/0089560 | A1* | 3/2015 | Park | H04L 65/607 725/116 |
| 2016/0057067 | A1* | 2/2016 | Jagadish | H04L 69/326 370/230 |
| 2016/0218956 | A1* | 7/2016 | Kumar | H04L 41/12 |
| 2017/0300349 | A1* | 10/2017 | Shaw | G06F 9/45558 |
| 2018/0083884 | A1* | 3/2018 | Kuang | H04L 49/9005 |

OTHER PUBLICATIONS

Braun, T. et al., "TCP Support for Sensor Networks", Fourth Annual Conference on Wireless on Demand Network Systems and Services, Jan. 24-26, 2007, pp. 162-169, Oberguyrgl, Austria.

* cited by examiner

COMPUTER PROGRAM, COMPUTER-READABLE STORAGE MEDIUM TRANSMITTING DEVICE, RECEIVING DEVICE AND METHODS PERFORMED THEREIN FOR TRANSFERRING BACKGROUND USER DATA

TECHNICAL FIELD

Embodiments herein relate a computer program, a computer-readable storage medium transmitting device, a receiving device and methods performed therein for communication of data. In particular, embodiments herein relate to transferring background user data to the receiving device in a communication network.

BACKGROUND

In a typical communication network, communication devices, also known as wireless devices, servers, access nodes, and/or user equipments (UEs), communicate via an access network e.g. a Radio Access Network (RAN) to one or more core networks. The access network covers a geographical area which is being served by an access node or a base station, e.g., a radio base station (RBS), which in some networks may also be denoted, for example, a "NodeB" or "eNodeB".

The Internet of Things (IoT) is the communication network of communication devices such as electronics, software, sensors, to enable the communication devices to exchange data with the manufacturer, operator and/or other connected devices based on the infrastructure of International Telecommunication Union's Global Standards Initiative. The Internet of Things allows objects to be sensed and controlled remotely across existing communication network infrastructure resulting in improved efficiency, accuracy and with an economic benefit.

In the context of Internet of Things, a huge number of communication devices will be deployed in the communication network. Some of the communication devices are designed to be "deployed and function" across the whole lifecycle, while however many of the communication devices still need to be maintained in terms of software upgrade and reconfiguration, or simply health checking.

From a maintainability point of view, software upgrade and reconfiguration should be done remotely via the communication network instead of sending out a field engineer to the communication device. This can today be achieved by pushing data from a central server to gateways and then to specific communication devices. The communication devices may also initiate communication transactions to send health data.

Usually such maintenance work is not critical, meaning, for example, software upgrade can be allowed to be done within a couple of days or reconfiguration within the next couple of hours. However with today's solution, a first scenario may occur where a large amount of data that are not service related will be transmitted within a short period of time. A service may e.g. be that the communication device, being a sensor, is reporting a temperature. A second scenario that may occur is where separated transactions that are also not service related may be needed to be initiated.

Both of the aforementioned actions will result in an increasing load of the communication network and also fast battery drain of the communication devices.

For the first scenario, the increased load of the communication network will affect Quality of Service (QoS) of transmission of service data, and also put a big impact to the battery of the communication devices. The communication devices may be solar-powered and not meant for highly loaded communication networks.

For the second scenario, separated transactions are needed to transmit health data from communication devices to e.g. a central server. Since health data themselves are usually quite small, a protocol overhead of network protocols is not negligible, and this will put unnecessary load on the communication devices as well as the communication network.

On the other hand, service data are also considerably small compared with the protocol overhead. Usually those communication devices are designed to report a small chunk of data according to some time interval, e.g. reporting humidity, temperature, $CO_2$ level, etc.

Traditional way of transferring background user data e.g. software upgrade and hence applying reconfiguration and upgrade is to choose a time that isn't very critical in in terms of load such as midnight. However given the heterogeneity of the communication devices, it would be hard or even not possible to find such a time.

Prior solutions provide an inefficient use of resources for communicating user data to the communication devices. This results in a limited performance of the communication network as well as the communication devices receiving the user data, called receiving devices, or transmitting the user data, called transmitting devices.

SUMMARY

An object of embodiments herein is to provide a mechanism that improves performance of the communication network.

According to an aspect the object is achieved by a method performed by a transmitting device for transferring background user data to a receiving device in a communication network. The transmitting device intercepts a packet, which packet comprises foreground user data in a payload field of the packet. The transmitting device determines that the packet is intended for the receiving device. The transmitting device establishes an available amount of data in the payload field of the packet. The transmitting device adds the background user data for the receiving device to the established available amount of data in the payload field. The transmitting device transmits the packet with the foreground user data and the background user data to the receiving device.

According to another aspect the object is achieved by a method by a receiving device for receiving background user data from a transmitting device in a communication network. The receiving device intercepts a packet, which packet comprises foreground user data in a payload of the packet. The receiving device determines that the packet is intended for the receiving device. The receiving device extracts the background user data from the payload and forwards the packet with the foreground user data to another application in the receiving device or another receiving device.

According to yet another aspect the object is achieved by providing a transmitting device for transferring background user data to a receiving device in a communication network. The transmitting device being configured to intercept a packet, which packet comprises foreground user data in a payload field of the packet. The transmitting device being configured to determine that the packet is intended for the receiving device. The transmitting device is further configured to establish an available amount of data in the payload field of the packet, and to add the background user data for the receiving device to the established available amount of data in the payload field. The transmitting device is also configured to transmit the packet with the foreground user data and the background user data to the receiving device.

According to a further aspect the object is achieved by providing a receiving device for receiving background user data from a transmitting device in a communication network. The receiving device being configured to intercept a packet, which packet comprises foreground user data in a payload of the packet. The receiving device being configured to determine that the packet is intended for the receiving device. The receiving device further being configured to extract the background user data from the payload; and to forward the packet with the foreground user data to another application in the receiving device or another receiving device.

A computer program and a computer-readable storage medium to perform the methods herein are also provided.

An advantage of embodiments of the claimed solution is that the background user data is added to available bits in the payload field of the packet carrying foreground user data. Thus the resources of the communication network are utilized in an efficient manner resulting in an improved performance of the communication network.

BRIEF DESCRIPTION OF THE DRAWINGS

Embodiments will now be described in more detail in relation to the enclosed drawings, in which.

DETAILED DESCRIPTION

Figure 1:
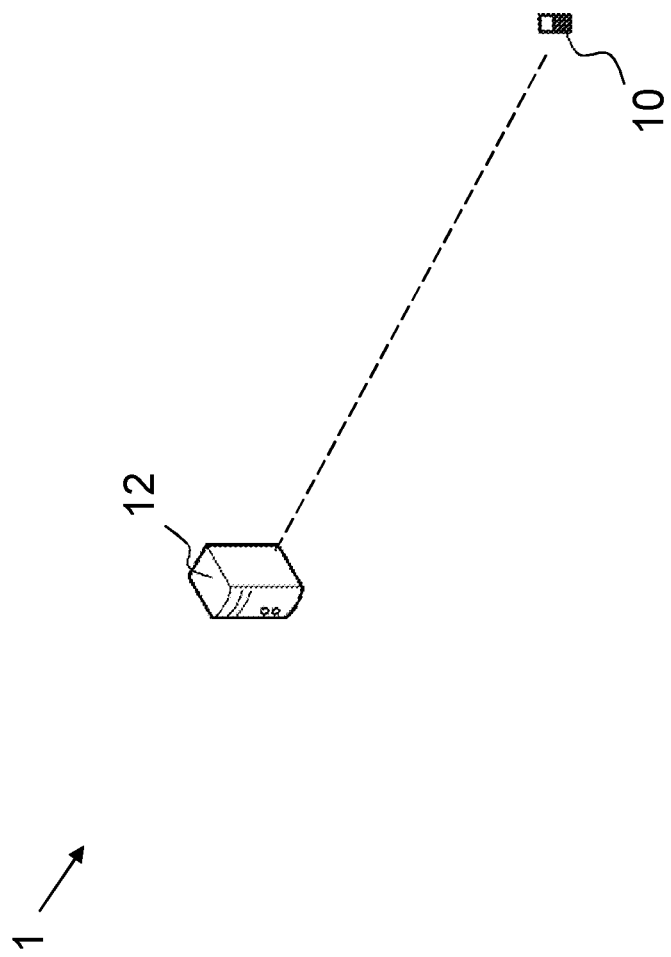
FIG. 1 is a schematic overview depicting a communication network according to embodiments herein.

Embodiments herein relate to communication networks in general. FIG. 1 is a schematic overview depicting a communication network 1. The communication network 1 may for example be a communication network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, a network comprising of any combination of Radio Access Technologies (RATs) comprising e.g. Multi-Standard Radio (MSR) base stations, multi-RAT base stations etc., any 3rd Generation Partnership Project (3GPP) cellular network, WFi networks, Worldwide Interoperability for Microwave Access (WiMax), 5G system or any cellular or wired network or system.

A receiving device 10, e.g. a wireless device or a radio access node such as a radio base station, is comprised in the communication network 1. The receiving device 10 is herein exemplified as a wireless device also known as a mobile station, a user equipment, a station (STA) and/or a wireless terminal, communicates via a Radio Access Network (RAN) to one or more core networks (CN). It should be understood by the skilled in the art that "wireless device" is a non-limiting term which means any wireless terminal, user equipment, a communication/battery constrained device, a Machine Type Communication (MTC) device, a Device to Device (D2D) terminal, or a node e.g. Personal Digital Assistant (PDA), laptop, mobile phone, sensor, relay, mobile tablets or even a small base station communicating within respective cell.

The communication network 1 covers a geographical area which is divided into areas, e.g. a cell being served by a radio access node.

The receiving device 10 receives data from a transmitting device 12. The transmitting device 12 may be a radio access node, a wireless device or any communication device transmitting data to the receiving device 10. For example, the transmitting device 12 may be a server, a gateway, or a communication/battery constrained device such as a sensor or similar. The transmitting device 12 is herein exemplified as a radio network node such as a WFi access point or a gateway. The transmitting device 12 may further be a radio base station that may also be referred to as a NodeB, an evolved Node B (eNB, eNode B), a base transceiver station, Access Point Base Station, base station router, or any other network unit capable of communicating with a user equipment within the area served by the radio base station depending e.g. on the radio access technology and terminology used.

In the following sections, user data such as service data will be referred as foreground user data, and user data such as non-service data, e.g. software upgrade, reconfiguration, health status, will be referred as background user data or as non time critical data. Embodiments herein relate to transferring background user data, in addition to foreground user data, to the receiving device 10 from the transmitting device 12.

As foreground user data, e.g. humidity, temperature, $CO_2$ level, etc., is rather small in terms of amount of data, protocol overhead of the protocol itself will be very noticeable in prior art solutions. Embodiments herein transfer background user data together with foreground user data by packing the background user data into otherwise not fully utilized packets. For example if foreground user data is only 1 byte, e.g. current temperature, to make it go through a TCP/IP stack, comparably huge headers will be added that results in an efficiency, e.g. payload size vs. packet size, somewhere around 2% thus with an protocol overhead of 98%. But by filling the packet with background user data the resources of the communication network are used in an efficient manner.

Figure 2:
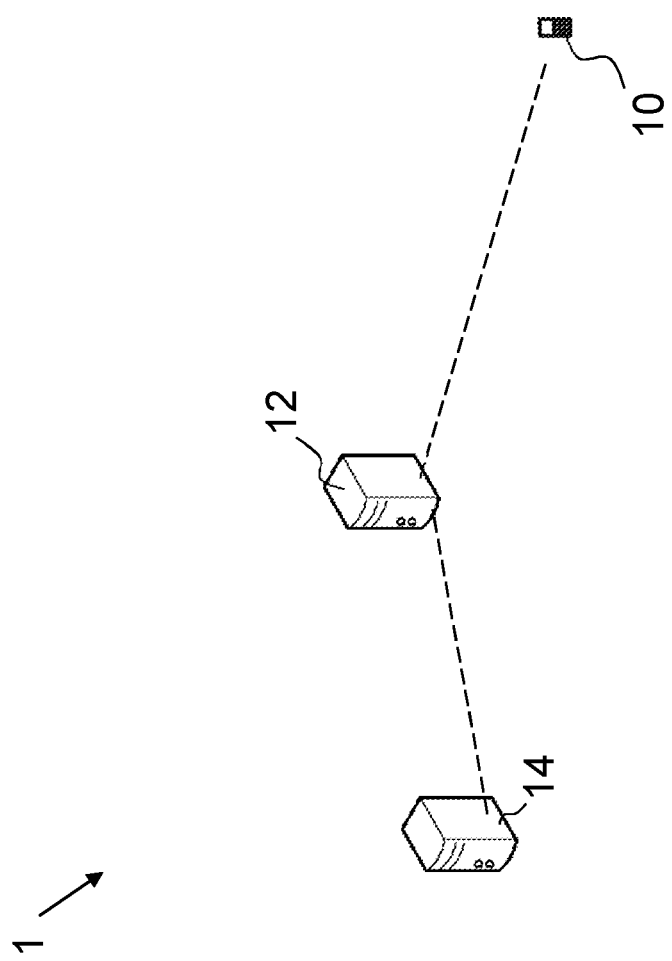
FIG. 2 is a schematic overview depicting a communication network according to embodiments herein.

FIG. 2 shows a schematic overview depicting a server 14 in the communication network 1 providing a service to the receiving device 10 such as a wireless device. The service is sent via the transmitting device 12 e.g. a gateway, an access node or similar. According to embodiments herein the transmitting device 12 intercepts a packet carrying foreground user data for the receiving device 10 and determines amount of available data in a payload field of the packet. The transmitting device 12 then adds background user data, which may be background user data divided into chunks, to the available part in the payload field in the packet. The packet is then transmitted to the receiving device 10. Embodiments herein thus improves efficiency of communication where blocks of data are sent with fixed overhead of header data. It should here be noted that the foreground user data may be intended for the receiving device 10 but may be intended for an application in another network node.

Figure 3:
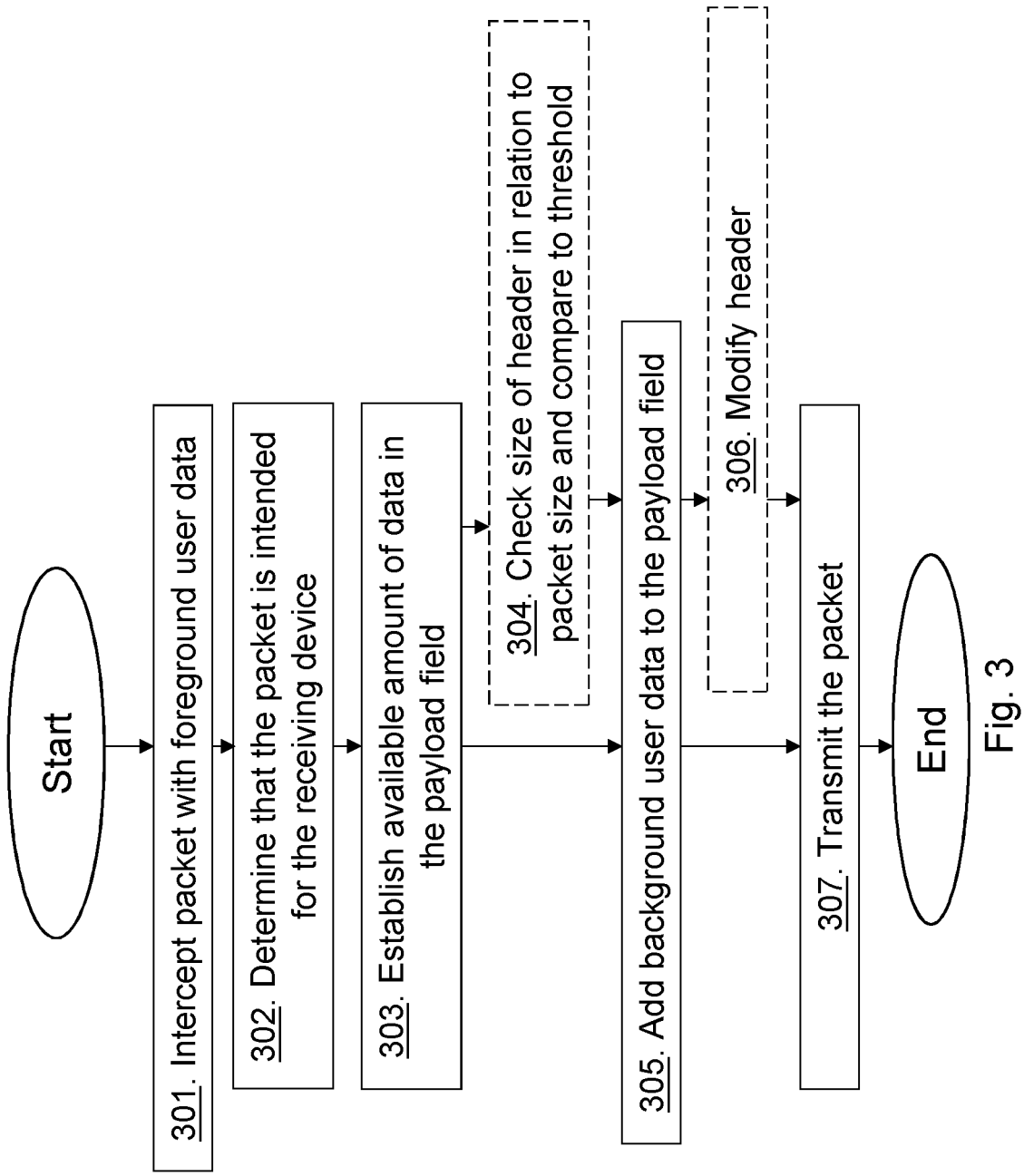
FIG. 3 is a schematic flowchart depicting a method performed in a transmitting device according to embodiments herein.

FIG. 3 is a schematic flowchart depicting a method performed by the transmitting device 12 for transferring background user data to the receiving device 10 in the communication network 1. The background user data may comprise non time critical data such as software upgrade, health indication, and/or configuration data, and the foreground user data may comprise service data such as humidity, temperature, $CO_2$ level, etc. The transmitting device 12 may comprise a server, a gateway, or a communication/battery constrained device. The actions do not have to be taken in the order stated below, but may be taken in any suitable order. Actions performed in some embodiments are marked with dashed boxes. Non time critical data is data that is not needed to be transferred within a certain time window but may be transferred over a longer time period and may be divided in chunks transferred irregularly.

Action 301. The transmitting device 12 intercepts a packet, which packet comprises foreground user data in a payload field of the packet. The packet may be intercepted from an application within the transmitting device 12 or from another network node such as the server 14. The foreground user data may be intended for the receiving device 12 or another receiving device. The packet may be a Transmission Control Protocol/Internet Protocol Acknowledgement (TCP/IP ACK) packet, wherein the foreground user data is the acknowledgement (ACK). The packet may be a TCP/IP packet but may further be of other non-TCP/IP protocols such as X.25, or even non-network protocol such as a serial communication protocol.

Action 302. The transmitting device 12 determines that the packet is intended for the receiving device 10. E.g. the transmitting device 12 may check the destination of the packet that it matches e.g. an Internet Protocol (IP) address of the receiving device 10. The packet may be sent to the receiving device 10 or via the receiving device 10.

Action 303. The transmitting device 12 establishes an available amount of data in the payload field of the packet. E.g. the transmitting device 12 checks how many bits is used for the foreground user data and how many bits are available.

Action 304. The transmitting device 12 may check a size of a header of the packet relative a size of the packet against a threshold; and only when the size of the header of the packet relative the size of the packet is above the threshold, the transmitting device 12 adds the background user data, see action 305 below. E.g. the transmitting device 12 may check payload versus packet size which is an indication of the size of the header, and when the payload size ratio is smaller than a payload threshold the background user data is added below.

Action 305. The transmitting device 12 adds the background user data for the receiving device 10 to the established available amount of data in the payload field. The packet with the foreground user data and background user data may in some embodiments not exceed a Maximum Transmission Unit (MTU). MTU of a communications protocol of a layer is the size (in bytes) of the largest protocol data unit that the layer can pass onwards. Data packets with background user data may not exceed MTU of the path. Exceeding the MTU would result in fragmentation generating more packets to be transmitted. Thus, fragmentation of packets implies that more packets are sent, which would then only contain background user data resulting in an increase of resources needed which is something that is avoided by putting a limit for the packet size to MTU. For IPv4 Path MTU is 68, while for IPv6 Path MTU it is 1280.

Action 306. The transmitting device 12 may modify a header of the packet indicating that the payload field comprises background user data. For example, the transmitting device 12 may change total length field and/or a bit indicating that background user data is added.

Action 307. The transmitting device 12 transmits the packet with the foreground user data and the background user data to the receiving device 10.

Figure 4:
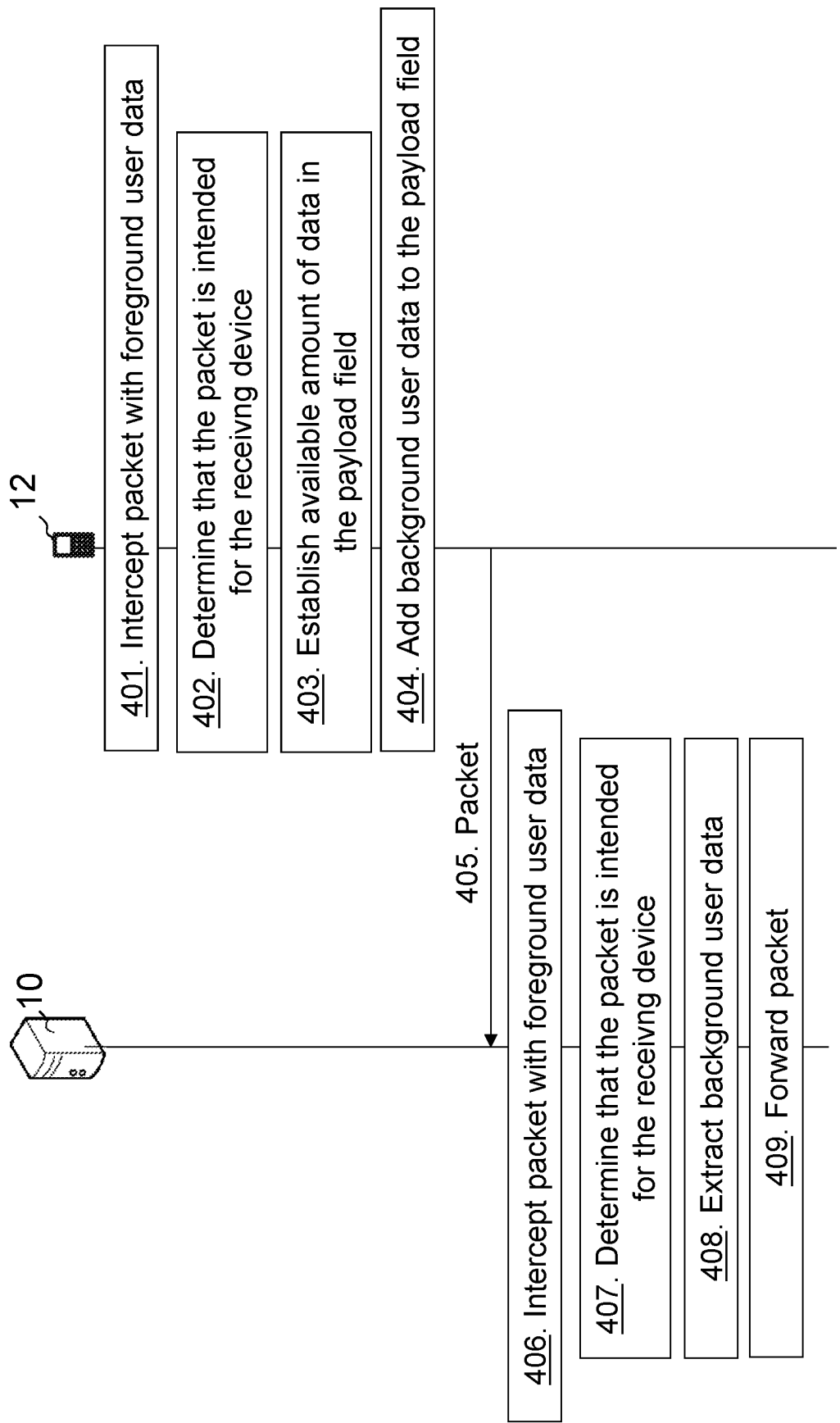
FIG. 4 is a combined signalling scheme and flow chart depicting embodiments herein.

FIG. 4 is a schematic combined signaling scheme and flowchart wherein the transmitting device 12 is exemplified as a wireless device and the receiving device 10 is exemplified as a server or a gateway.

Action 401. The transmitting device 12 intercepts a packet comprising foreground user data in a payload field of the packet. E.g. the transmitting device 12 intercepts a packet from an application measuring temperature the transmitting device 12 being e.g. a sensor with constrained communication or battery capability.

Action 402. The transmitting device 12 determines that the packet is intended for the receiving device 10. E.g. check destination address of the packet.

Action 403. The transmitting device 12 establishes an available amount of data in the payload field of the packet. E.g. the transmitting device 12 determines how much data the payload field may comprise until the packet does not exceed MTU.

Action 404. The transmitting device 12 then adds the background user data for the receiving device 10 to the established available amount of data in the payload field. The transmitting device 12 may divide background user data to fit in a number of packets to the receiving device 10.

Action 405. The transmitting device 12 transmits the packet with the foreground user data and the background user data to the receiving device 10.

Action 406. The receiving device 10 intercepts the packet comprising the foreground user data in the payload field of the packet.

Action 407. The receiving device 10 determines that the packet is intended for the receiving device 10. E.g. the packet is destined for the receiving device 10 or to be transferred via the receiving device 10.

Action 408. The receiving device 10 extracts the background user data from the payload field.

Action 409. The receiving device 10 forwards the packet with the foreground user data to another application in the receiving device 10 or another receiving device.

Figure 5:
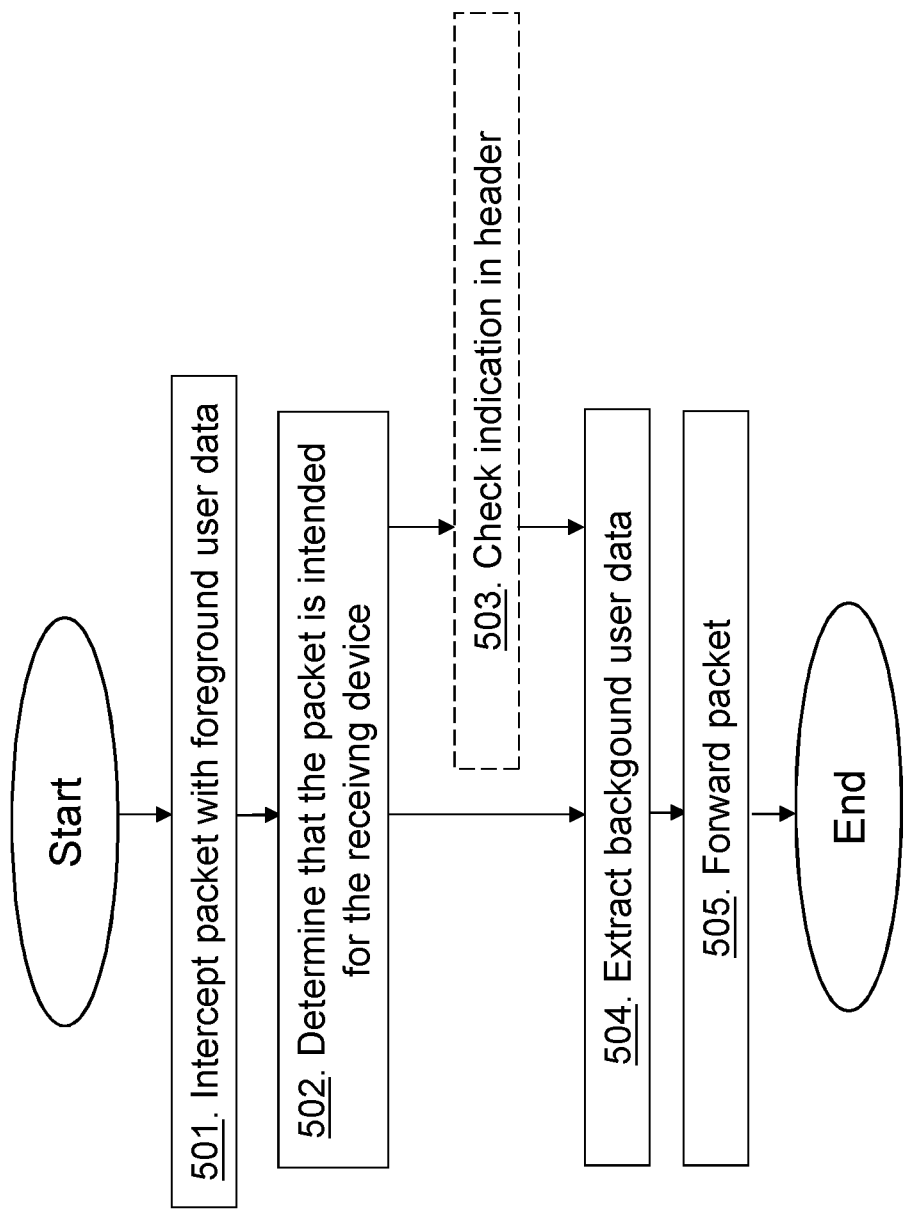
FIG. 5 is a schematic flowchart depicting a method performed in a receiving device according to embodiments herein.

The method actions in the receiving device 10 for receiving background user data from the transmitting device 12 in the communication network 1 according to some embodiments will now be described with reference to a flowchart depicted in FIG. 5. The actions do not have to be taken in the order stated below, but may be taken in any suitable order. Actions performed in some embodiments are marked with dashed boxes. The receiving device 10 may comprise a server, a gateway, or a communication/battery constrained device such as a sensor.

Action 501. The receiving device 10 intercepts a packet, which packet comprises foreground user data in a payload field of the packet. The background user data may comprise software upgrade, health indication, and/or configuration data, and foreground user data may comprise service data. The packet may be a Transmission Control Protocol/Internet Protocol Acknowledgement (TCP/IP ACK) packet. The packet may further be of other non-TCP/IP protocols such as X.25, or even non-network protocol such as serial communication protocol.

Action 502. The receiving device 10 determines that the packet is intended for the receiving device 10. E.g. a destination address such as an IP or Medium Access Control (MAC) address of the receiving device 10 depending on routing or switching And in case of not TCP/IP, the address may be defined by a specific protocol. When forwarding foreground user data the receiving device's address may be registered in a routing table or may be determined by Address Resolution Protocol (ARP) in case of TCP/IP.

Action 503. The receiving device 10 may check an indication in a header of the packet indicating that the payload field comprises background user data, and when the indication indicates that the payload field comprises background user data the receiving device 10 extracts the background user data, see action 504. For example, the receiving device 10 may check a header field indicating whether the packet comprises background user data or not.

Action 504. The receiving device 10 extracts the background user data from the payload field.

Action 505. The receiving device 10 forwards the packet with the foreground user data to another application in the receiving device 10 or another receiving device. E.g. after extracting the background user data, normal routing and switching procedure may be applied.

Following may be definitions of protocol overhead and efficiency ratios:

$$\text{Protocol overhead} = \frac{\text{Packet size} - \text{Payload size}}{\text{Packet size}}$$

$$\text{Protocol efficiency} = \frac{\text{Payload size}}{\text{Packet size}}$$

As being discussed in above, background user data is usually non time critical data, it is feasible to split the background user data into chunks and pack each chunk into a normal foreground user data packet to make the protocol overhead and efficiency ratios more reasonable and hence making communication more efficient.

More specifically, taking TCP ACK packet for example, it is purely used as protocol data containing acknowledgement as foreground user data, and this kind of packet will sent over communication channel quite a few times during one conversation. It would be more efficient if it can carry certain amount of payload and by splitting and adding the background user data to the payload field, protocol overhead will be decreased while protocol efficiency will be increased. Also because there will be no big amount of data being transmitted within a short period of time, there is no impact on foreground user data and a limited impact on battery consumption. For example a typical Transmission Control Protocol (TCP) packet header has minimum size of 20 bytes and maximum 40 bytes, and a TCP/IP ACK packet has the size more than 50 bytes including IP header and MAC header. By adding the background user data for the receiving device 10 to the available amount of data in the payload field provides an efficient utilization of resources or communication resources. Another example of a transmitting device 12 may be a motion sensor reporting whether there is any movement or not. The reported value is a Boolean, I/O, which can be just 1 bit. Thus, the payload field may be filled with background user data leading to an improved protocol efficiency.

Effectively embodiments herein may be implemented at any layer of Internet protocol stack. In the following sub-sections it is discussed how it could be implemented at different layers.

Link Layer

Implementation of embodiments at this layer where communication occurred over Internet it is preferred to inspect headers of higher transport layers. This is because when a packet at Link layer is formed at a source application or node, the MAC address of destination is generally unknown. But if the background user data is added at the transmitting device 12 on a last mile communication, e.g. within a Local Area Network (LAN), then the adding may be implemented at the Link layer. Last mile is a common term referring to that portion of a communication network chain that physically reaches the receiving device 10.

According to these embodiments the transmitting device 12 is a special gateway which is seating on a same physical network with the receiving device 10. The transmitting device 12 is directly communicating with the receiving device 10 over the physical layer. The transmitting device 12 has the background user data that needs to be transferred to the receiving device 10. The transmitting device 12 intercepts all packets from any source that is intended for the receiving device 10 and it complements the foreground user data with portion/or all of background user data to fill up the MAC packet to the maximum size that could be transferred to the receiving device 10.

These embodiments provide a gateway with special functionality and with the advantage that the background user data may be added to all traffic that is coming from any source intended for the receiving device 10.

Furthermore, many protocols on the physical layer have imbedded mechanisms of verification and acknowledgment of correct delivery of packets, thus all packets could be guaranteed to be delivered with no losses and in right order regardless of what higher level protocols are used as carrying the foreground user data. Thus more background user data could be pushed utilizing all traffic. This results in that there is no need to implement packet order and loss recovery in the receiving device 10 even if User Datagram Protocol (UDP) like traffic is added/filled with the background user data. UDP uses a simple connectionless transmission model with a minimum of protocol mechanism. It has no handshaking dialogues, and thus exposes any unreliability of the underlying network protocol to the user's program. There is no guarantee of delivery, ordering, or duplicate protection.

In addition, since the transmitting device 12 may be a less constrained device compared to the receiving device 10 in terms of power, computation, storage etc, the background user data could be transferred from the source to the transmitting device 12 over ordinary communication like TCP/IP. This will insure correct file delivery from the source to the transmitting device 12 and at the same time it does not slow down delivery of foreground user data on the segment of the communication network from the source to the transmitting device 12. The increase of latency is due to the fact that longer packets take longer to transfer from one network node to another. Also longer packets have higher probability to be corrupted, and to be lost, during transfer.

Figure 6:
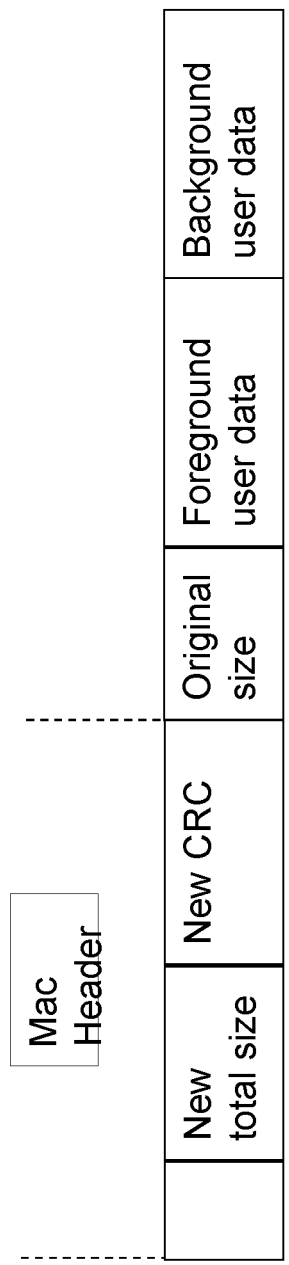
FIG. 6 is a schematic overview depicting a packet with a MAC header according to some embodiments herein.

According to these embodiments the transmitting device 12 makes changes only to a MAC header e.g. a new cyclic redundancy check (CRC) field and a new total size field may be added to the MAC header, see FIG. 6. The original length is kept with the foreground user data and where the background user data is added to the payload field. Total length, checksums, etc. of UDP, TCP, IP headers could remain the same as in original packet as the packet is not going any more through general Internet infrastructure where such expended packet would be discarded as invalid since IP, TCP, UDP headers are not modified according to modified structure of the packet.

Internet Layer

Embodiments will be described from the protocol IPv4 point of view.

An intermediate layer in transport protocol stack may be inserted between Link layer and Internet layer.

A single IP address may correspond to multiple receiving devices, e.g. if the receiving device 10 is behind a gateway in a private network address space then all communication devices in that private network are addressed by the same public IP address of the gateway. Furthermore, any modification of data in packets generally changes values in the headers of the Transport layer. Thus, the intermediate layer may not treat data section of the packet coming from or sent to Internet layer as a black box. The transport layer header may be inspected to identify destination of the packet and the transmitting device 12 may modify headers of the packet according to changes made in packet, such as checksums and length where applicable.

The transmitting device 12 intercepts all packets which are coming from Internet layer towards link layer. The transmitting device 12 further adds background user data towards the end of foreground user data such that in total packet is e.g. exactly of IPv4 Path MTU size. The transmitting device 12 may further copy total length field of the header and insert the total length field before the beginning of payload field. Now total length of original non modified packet is stored in first 2 bytes in the payload field. The transmitting device 12 may modify total length field in the header of the packet to be equal to IPv4 Path MTU size. Total length field may be a 16-bit field that defines the entire packet size, including header and data, in bytes.

Furthermore, the transmitting device 12 may recalculate and modify checksum in the header of Transport Layer to reflect modifications, and may modify UDP length field if UDP is used.

The receiving device 10 receiving packets that are coming from Link layer towards Internet layer are intercepted and the total length field may be copied from the beginning of payload field to the header. The receiving device 12 extracts the background user data from the payload field and removes it from the packet. The beginning of background user data is uniquely defined by total length field and Internet Header Length (IHL) field in the header. IHL defines the length of the IP header. The receiving device 10 may then recalculate and modify checksum in the header of Transport Layer to reflect modifications, and/or may modify UDP length field if UDP is used.

Transport Layer

Implementing embodiments herein at the Internet layer implies that the layer does not guaranty delivery of packets. For file transfer service the mechanism of in order guaranteed delivery need to be implemented at the intermediate layer that we introduce. However, instead the intermediate layer may be implemented on the Transport layer and limit some embodiments to the TCP protocol which has all delivery guarantees implemented. The Intermediate layer in transport protocol stack may thus be inserted between Internet layer and Transport Layer.

Application Layer

Implementation of embodiments herein may further be done at Application layer. For example instead of returning an empty Hypertext Transfer Protocol (HTTP) 200 response from a server side, additional background user data may be appended to the HTTP 200 response. HTTP 200 response is a standard response for successful a HTTP request. This approach is simple to implement.

Figure 7:
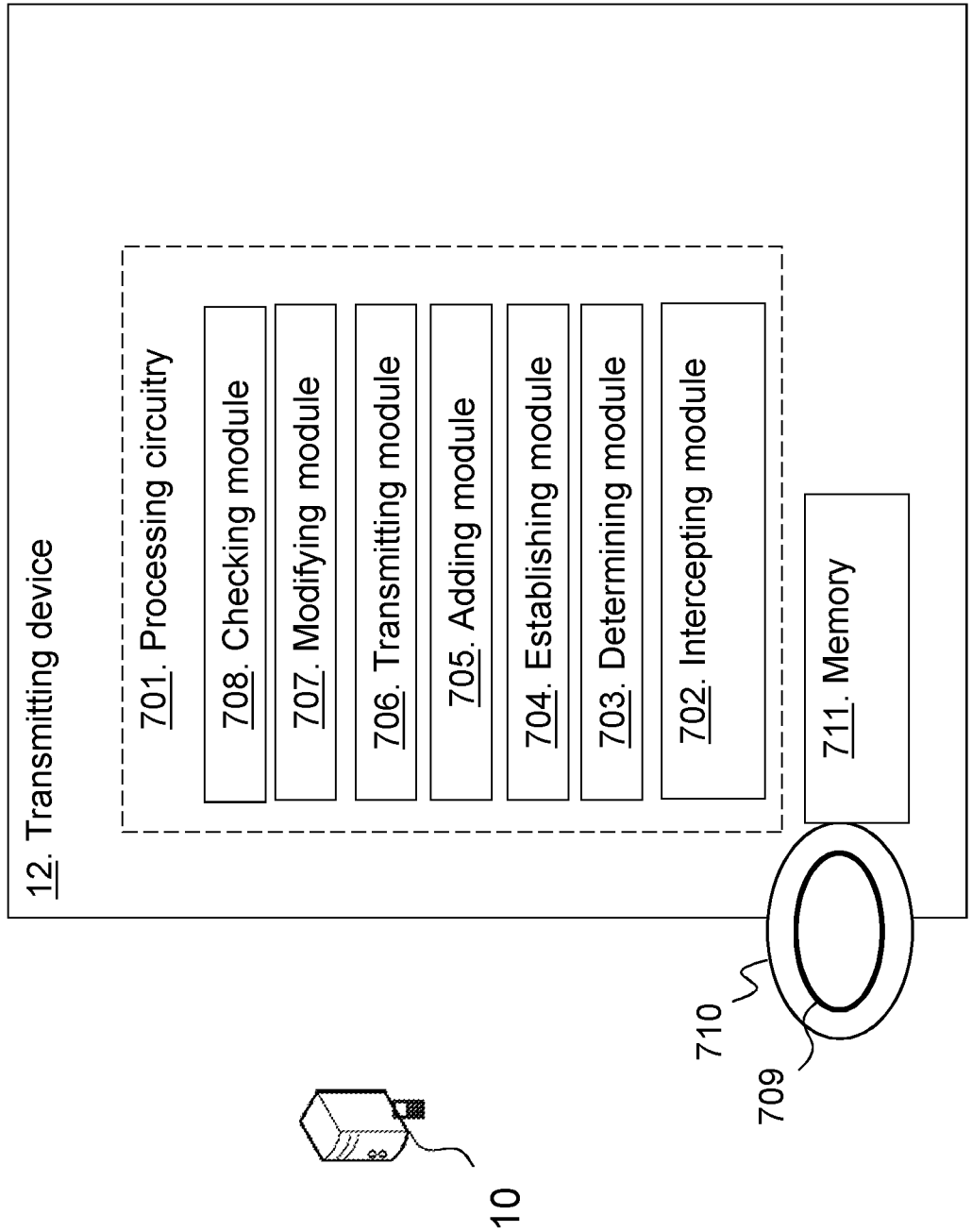
FIG. 7 is a block diagram depicting a transmitting device according to embodiments herein.

In order to perform the methods disclosed herein the transmitting device 12 is provided. FIG. 7 shows a block diagram depicting the transmitting device 12 for transferring the background user data to the receiving device 10 in the communication network 1. The transmitting device 12 may be a server, a gateway, or a communication/battery constrained device. The transmitting device 12 may comprise processing circuitry 701 configured to perform the methods herein.

The transmitting device 12 is configured to intercept a packet, which packet comprises foreground user data in a payload field of the packet. E.g. the transmitting device 12 may comprise an intercepting module 702. The processing circuitry 701 and/or the intercepting module 702 may be configured to intercept the packet, which packet comprises foreground user data in the payload field of the packet. The transmitting device 12 may be configured to intercept the packet from an application within the transmitting device 12 or from another network node. For example, the processing circuitry 701 and/or the intercepting module 702 may be configured to intercept the packet from an application within the transmitting device 12 or from another network node.

The transmitting device 12 is further configured to determine that the packet is intended for the receiving device 10. E.g. the transmitting device 12 may comprise a determining module 703. The processing circuitry 701 and/or the determining module 703 may be configured to determine that the packet is intended for the receiving device 10.

The transmitting device 12 is further configured to establish an available amount of data in the payload field of the packet. E.g. the transmitting device 12 may comprise an establishing module 704. The processing circuitry 701 and/or the establishing module 704 may be configured to establish the available amount of data in the payload field of the packet.

The transmitting device 12 is further configured to add the background user data for the receiving device 10 to the established available amount of data in the payload field. E.g. the transmitting device 12 may comprise an adding module 705. The processing circuitry 701 and/or the adding module 705 may be configured to add the background user data for the receiving device 10 to the established available amount of data in the payload field.

The transmitting device 12 is further configured to transmit the packet with the foreground user data and the background user data to the receiving device 10. E.g. the transmitting device 12 may comprise a transmitting module 706. The processing circuitry 701 and/or the transmitting module 706 may be configured to transmit the packet with the foreground user data and the background user data to the receiving device 10.

The background user data may comprise non time critical data such as software upgrade, health indication, and/or configuration data, and the foreground user data may comprise service data. The packet may be a TCP/IP ACK packet.

The transmitting device 12 may further be configured to modify a header of the packet indicating that the payload field comprises background user data. E.g. the transmitting device 12 may comprise a modifying module 707. The processing circuitry 701 and/or the modifying module 707 may be configured to modify a header of the packet indicating that the payload field comprises background user data. The packet with the foreground user data and background user data may not exceed a MTU.

The transmitting device 12 may further be configured to check a size of a header of the packet relative a size of the packet against a threshold; and only when the size of the header of the packet relative the size of the packet is above the threshold, the transmitting device 12 is configured to add the background user data to the packet. E.g. the transmitting device may comprise a checking module 708. The processing circuitry 701 and/or the checking module 708 may be configured to check a size of a header of the packet relative a size of the packet against a threshold; and only when the size of the header of the packet relative the size of the packet is above the threshold, the processing circuitry 701 and/or the adding module 705 is configured to add the background user data to the packet.

The methods according to the embodiments described herein for the transmitting device 12 are respectively implemented by means of e.g. a computer program 709 or a computer program product, comprising instructions, i.e., software code portions, which, when executed on at least one processor, cause the at least one processor to carry out the actions described herein, as performed by the transmitting device 12. The computer program 709 may be stored on a computer-readable storage medium 710, e.g. a disc or similar. The computer-readable storage medium 710, having stored thereon the computer program, may comprise the instructions which, when executed on at least one processor, cause the at least one processor to carry out the actions described herein, as performed by the transmitting device 12. In some embodiments, the computer-readable storage medium may be a non-transitory computer-readable storage medium.

The transmitting device 12 further comprises a memory 711. The memory comprises one or more units to be used to store data on, such as packets, background user data, thresholds, packet sizes, applications to perform the methods disclosed herein when being executed, and similar.

Figure 8:
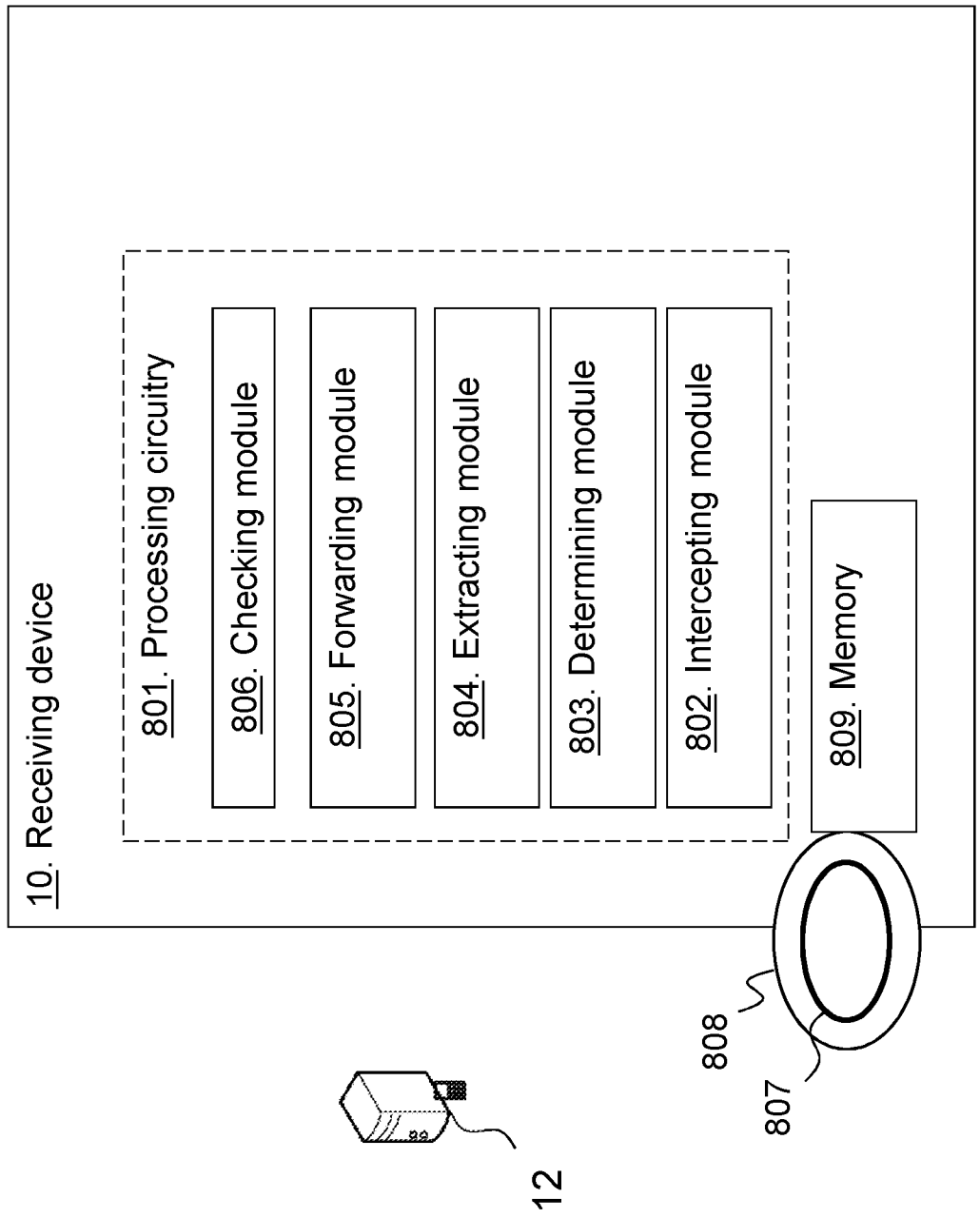
FIG. 8 is a block diagram depicting a receiving device according to embodiments herein.

In order to perform the methods disclosed herein the receiving device 10 is provided. FIG. 8 shows a block diagram depicting the receiving device 10 for receiving the background user data from the transmitting device 12 in the communication network 1. The receiving device 10 may comprise processing circuitry 801 configured to perform the method herein.

The receiving device 10 is configured to intercept the packet, which packet comprises foreground user data in a payload field of the packet. The receiving device 10 may comprise an intercepting module 802. The processing circuitry 801 and/or the intercepting module 802 may be configured to intercept the packet, which packet comprises foreground user data in the payload field of the packet.

The receiving device 10 is configured to determine that the packet is intended for the receiving device 10. The receiving device 10 may comprise a determining module 803. The processing circuitry 801 and/or the determining module 803 may be configured to determine that the packet is intended for the receiving device 10.

The receiving device 10 is configured to extract the background user data from the payload field. The receiving device 10 may comprise an extracting module 804. The processing circuitry 801 and/or the extracting module 804 may be configured to extract the background user data from the payload field.

The receiving device 10 is configured to forward the packet with the foreground user data to another application in the receiving device 10 or another receiving device. The receiving device 10 may comprise a forwarding module 805. The processing circuitry 801 and/or the forwarding module 805 may be configured to forward the packet with the foreground user data to another application in the receiving device 10 or another receiving device.

The receiving device 10 may be configured to check an indication in a header of the packet indicating that the payload field comprises background user data, and when the indication indicates that the payload field comprises background user data the receiving device 10 is configured to extract the background user data from the packet. The receiving device 10 may comprise a checking module 806. The processing circuitry 801 and/or the checking module 806 may be configured to check the indication in the header of the packet indicating that the payload field comprises background user data, and when the indication indicates that the payload field comprises background user data the processing circuitry 801 and/or the extracting module 804 is configured to extract the background user data from the packet.

The background user data may comprise software upgrade, health indication, and/or configuration data, and the foreground user data may comprise service data. The packet may be a TCP/IP ACK packet. The receiving device 10 may be a server, a gateway, or a communication/battery constrained device.

The methods according to the embodiments described herein for the receiving device are respectively implemented by means of e.g. a computer program 807 or a computer program product, comprising instructions, i.e., software code portions, which, when executed on at least one processor, cause the at least one processor to carry out the actions described herein, as performed by the receiving device 10. The computer program 807 may be stored on a computer-readable storage medium 808, e.g. a disc or similar. The computer-readable storage medium 808, having stored thereon the computer program, may comprise the instructions which, when executed on at least one processor, cause the at least one processor to carry out the actions described herein, as performed by the receiving device 10. In some embodiments, the computer-readable storage medium may be a non-transitory computer-readable storage medium.

The receiving device 10 further comprises a memory 809. The memory comprises one or more units to be used to store data on, such as packets, background user data, thresholds, packet sizes, applications to perform the methods disclosed herein when being executed, and similar.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a receiving or transmitting device, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/ or program or application data, and non-volatile memory. Other hardware, conventional and/or custom, may also be included. Designers of communications receivers will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method, performed by a transmitting device, for transferring user data to a receiving device in a communication network, the method comprising:
   intercepting a foreground packet, the foreground packet comprising foreground user data in a payload field of the packet;
   determining that the foreground packet is intended for the receiving device;
   establishing an available number of bits in the payload field of the foreground packet;
   depending on an available number of bits in the payload field of the foreground packet, inserting background user data for the receiving into the foreground packet to reduce signaling overhead by lowering a ratio of bits in the header of the foreground packet to bits in the payload of the foreground packet; and
   transmitting the foreground packet containing both the foreground user data and the background user data to the receiving device;
   wherein the background user data comprises software upgrade data, health indication data, and/or configuration data and the foreground user data comprises service data.

2. The method of claim 1, further comprising modifying a header of the packet indicating that the payload field comprises background user data.

3. The method of claim 1, wherein the packet with the foreground user data and background user data does not exceed a Maximum Transmission Unit.

4. The method of claim 1, wherein the packet is intercepted from an application within the transmitting device or from another network node.

5. The method of claim 1, further comprising
   checking a size of a header of the packet relative to a size of the packet against a threshold; and
   only when the size of the header of the packet relative the size of the packet is above the threshold, performing the adding the background user data.

6. A method, performed by a receiving device, for receiving user data from a transmitting device in a communication network, the method comprising:
   intercepting a foreground packet, the packet comprising foreground user data in a payload field of the packet and background user data inserted into the payload field to reduce signaling overhead by lowering a ratio of bits in the header of the foreground packet and bits In the payload field;
   determining that the foreground packet is intended for the receiving device;
   determining a number of bits in the payload filed containing background data and extracting the background user data from the payload field of the foreground packet; and
   forwarding the foreground packet containing both the foreground user data to another application in the receiving device or another receiving device;
   wherein the background user data comprises software upgrade data, health indication data, and/or configuration data and the foreground user data comprises service data.

7. The method of claim 6, further comprising:
   checking an indication in a header of the packet indicating that the payload field comprises background user data; and
   in response to the indication indicating that the payload field comprises background user data, performing the extracting the background user data.

8. A transmitting device for transferring user data to a receiving device in a communication network, the transmitting device comprising:
   processing circuitry;
   memory containing instructions executable by the processing circuitry whereby the transmitting device is operative to:
      intercept a foreground packet, the packet comprising foreground user data in a payload field of the packet;
      determine that the foreground packet is intended for the receiving device;
      establish an available number of bits in the payload field of the foreground packet;
      depending on an available number of bits in the payload field of the foreground packet, insert background user data for the receiving into the foreground packet to reduce signaling overhead by lowering a ratio of bits in the header of the foreground packet to bits in the payload of the foreground packet; and
      transmit the foreground packet containing both the foreground user data and the background user data to the receiving device;
      wherein the background user data comprises software upgrade data, health indication data, and/or configuration data; and the foreground user data comprises service data.

9. The transmitting device of claim 8, wherein the instructions are such that the transmitting device is operative to modify a header of the packet indicating that the payload field comprises background user data.

10. The transmitting device of claim 8, wherein the packet is a Transmission Control Protocol/Internet Protocol Acknowledgement packet.

11. The transmitting device of claim 8, wherein the packet with the foreground user data and background user data does not exceed a Maximum Transmission Unit.

12. The transmitting device of claim 8, wherein the instructions are such that the transmitting device is operative to intercept the packet from an application within the transmitting device or from another network node.

13. The transmitting device of claim 8, wherein the transmitting device is a server, a gateway, or a communication/battery constrained device.

14. The transmitting device of claim 8, wherein the instructions are such that the transmitting device is operative to:
  check a size of a header of the packet relative to a size of the packet against a threshold; and
  add the background user data to the packet only when the size of the header of the packet relative the size of the packet is above the threshold.

15. A receiving device for receiving user data from a transmitting device in a communication network, the receiving device comprising:
  processing circuitry;
  memory containing instructions executable by the processing circuitry whereby the receiving device is operative to:
    intercept a foreground packet, the foreground packet comprising foreground user data in a payload field of the packet and background user data inserted into the payload field to reduce signaling overhead by lowering a ratio of bits in the header of the foreground packet and bits In the payload field;
    determine that the foreground packet is intended for the receiving device;
    determine a number of bits in the payload filed containing background data and extract the background user data from the payload field of the foreground packet; and
    forward the foreground packet containing both the foreground user data to another application in the receiving device or another receiving device;
    wherein the background user data comprises software upgrade data, health indication data, and/or configuration data, and the foreground user data comprises service data.

16. The receiving device of claim 15, wherein the instructions are such that the receiving device is operative to:
  check an indication in a header of the packet indicating that the payload field comprises background user data; and
  in response to the indication indicating that the payload field comprises background user data, extract the background user data from the packet.

17. The receiving device of claim 15, wherein the packet is a Transmission Control Protocol/Internet Protocol Acknowledgement packet.

18. The receiving device of claim 15, wherein the receiving device is a server, a gateway, or a communication/battery constrained device.

19. A non-transitory computer readable recording medium storing a computer program product for controlling a transmitting device to transfer user data to a receiving device in a communication network, the computer program product comprising software instructions which, when run on processing circuitry of the transmitting device, causes the transmitting device to:
  intercept a foreground packet, the packet comprising foreground user data in a payload field of the foreground packet;
  determine that the foreground packet is intended for the receiving device;
  establish an available number of bits in the payload field of the foreground packet;
  depending on an available number of bits in the payload field of the foreground packet, insert background user data for the receiving into the foreground packet to reduce signaling overhead by lowering a ratio of bits in the header of the foreground packet to bits in the payload of the foreground packet; and
  transmit the foreground packet containing both the foreground user data and the background user data to the receiving device;
  wherein the background user data comprises software upgrade data, health indication data, and/or configuration data and the foreground user data comprises service data.

20. A non-transitory computer readable recording medium storing a computer program product for controlling receiving device for receiving user data from a transmitting device in a communication network, the computer program product comprising software instructions which, when run on processing circuitry of the receiving device, causes the receiving device to:
  intercept a foreground packet, the packet comprising foreground user data in a payload field of the packet and background user data inserted into the payload field to reduce signaling overhead by lowering a ratio of bits in the header of the foreground packet and bits In the payload field;
  determine that the foreground packet is intended for the receiving device;
  determine a number of bits in the payload filed containing background data and extract background user data from the payload field of the foreground packet; and
  forward the foreground packet containing the foreground user data to another application in the receiving device or another receiving device;
  wherein the background user data comprises software upgrade data, health indication data, and/or configuration data, and the foreground user data comprises service data.

* * * * *